United States Patent
Russell (10) Patent No.: US 10,088,200 B2
(45) Date of Patent: Oct. 2, 2018

(54) ALL-POLYMER FLAT PLATE HEATING SOLAR PANEL WITH INTEGRATED CONTROLLER

(71) Applicant: LONGVIEW GLOBAL ENTERPRISES, INC., Boise, ID (US)

(72) Inventor: Lynn D. Russell, Boise, ID (US)

(73) Assignee: Longview Global Enterprises, Inc., Boise, ID (US)

( * ) Notice: Subject to any disclaimer, the term of this patent is extended or adjusted under 35 U.S.C. 154(b) by 403 days.

(21) Appl. No.: 14/750,990

(22) Filed: Jun. 25, 2015

(65) Prior Publication Data

US 2015/0377515 A1    Dec. 31, 2015

Related U.S. Application Data

(60) Provisional application No. 62/016,971, filed on Jun. 25, 2014.

(51) Int. Cl.
*F24J 2/05* (2006.01)
*F24S 10/70* (2018.01)
(Continued)

(52) U.S. Cl.
CPC ............. *F24S 10/73* (2018.05); *B23P 15/26* (2013.01); *F24S 10/501* (2018.05); *F24S 10/502* (2018.05); *F24S 10/72* (2018.05); *F24S 50/40* (2018.05); *F24S 80/30* (2018.05); *Y02E 10/44* (2013.01)

(58) Field of Classification Search
CPC .... F24J 2/201; F24J 2/202; F24J 2/402; F24J 2/4647; F24J 2/242; F24J 2/243; B23P 15/26; Y02E 10/44
See application file for complete search history.

(56) References Cited

U.S. PATENT DOCUMENTS

3,951,128 A    4/1976   Shoenfelder
4,011,856 A    3/1977   Gallagher
(Continued)

*Primary Examiner* — Alfred Basichas
(74) *Attorney, Agent, or Firm* — Scott D. Swanson; Shaver & Swanson, LLP (57) ABSTRACT

A flat plate heating solar panel comprised of polymer materials that can withstand relatively high temperatures. The polymer materials utilized in the panel have similar thermal expansion characteristics so that different components can by connected to each other without excessive stresses and damage during temperature changes, and with major components capable of being fabricated by molding processes, including extrusion and injection molding. An expansion joint or slot is provided in the enclosure frame to allow relative movement between the header connector and the frame in order to minimize stresses when large temperature differences exist between the absorber/header and the frame, and the slot design also provides a vent to relieve excessive air pressures inside the panel at high temperatures. An electronic controller with wireless capability, powered by a small photovoltaic solar cell with energy storage by a supercapacitor or an ultracapacitor, is integrated with the panel to operate a pump to circulate a heat transfer fluid through the panel when heating capability exists and when heat is needed to increase the temperature of the substance to be heated by the panel.

20 Claims, 10 Drawing Sheets

(51) Int. Cl.
*B23P 15/26* (2006.01)
*F24S 80/30* (2018.01)
*F24S 50/40* (2018.01)
*F24S 10/50* (2018.01)

(56) References Cited

U.S. PATENT DOCUMENTS

| | | |
|---|---|---|
| 4,114,597 A | 9/1978 | Erb |
| 4,205,662 A | 6/1980 | Rhodes et al. |
| 4,227,514 A * | 10/1980 | Spitzer ............... F24J 2/20 126/663 |
| 4,416,265 A | 11/1983 | Wallace |
| 4,426,999 A | 1/1984 | Evans et al. |
| 4,898,153 A | 2/1990 | Sherwood |
| 5,794,611 A | 8/1998 | Bottum, Jr. et al. |
| 6,014,967 A | 1/2000 | Rekstad et al. |
| 6,196,216 B1 | 3/2001 | Kooij |
| 6,814,070 B2 | 11/2004 | Bourne et al. |
| 8,161,963 B2 | 4/2012 | Rhodes et al. |
| 8,474,446 B1 | 7/2013 | Rohr et al. |
| 2010/0322784 A1 | 12/2010 | Rubio et al. |
| 2013/0112190 A1 | 5/2013 | Sessler et al. |

* cited by examiner

Integrated Solar Panel Controller

**Fig. 14
Solar Panel Controller and Sensor**

ALL-POLYMER FLAT PLATE HEATING SOLAR PANEL WITH INTEGRATED CONTROLLER

PRIORITY/CROSS-REFERENCE TO RELATED APPLICATIONS

This application claims the benefit of U.S. Provisional Application No. 62/016,971 filed Jun. 25, 2014, the disclosure of which is incorporated by reference.

TECHNICAL FIELD

This invention generally relates to a flat plate solar collector, more specifically to an improved polymer-based flat plate heating solar panel.

BACKGROUND OF THE INVENTION

Field of the Invention

A wide variety of solar systems exist for collecting solar energy for heating fluids and for producing electricity. The invention described herein is for heating, not for producing electricity.

Some solar panels used for heating focus or concentrate the solar flux, while others do not. The typical solar panel used for heating fluids such as relatively low temperature water do not concentrate the solar flux, while those used to produce high temperature fluids such as steam typically concentrate the solar flux. The invention described herein is for low temperature heating of fluids and thus is in the category of non-concentrating solar collectors. Such a solar panel is called a flat plate collector.

Figure 1:
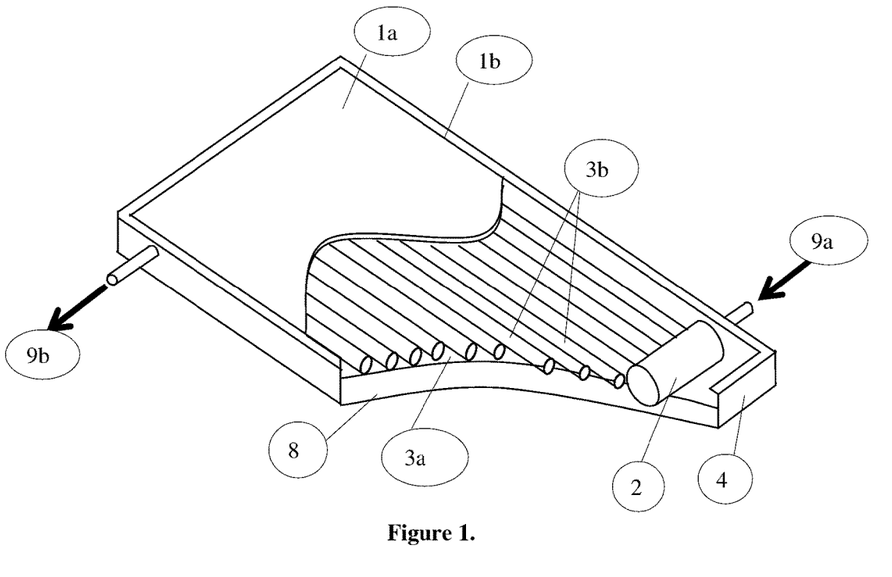
FIG. 1 shows a typical flat plate solar panel for heating fluids.

A typical flat plate solar panel for heating a fluid is shown in FIG. 1. Such solar panels typically include an insulated enclosure containing an absorber plate for absorbing the incident solar radiation, flow passages integrated with the absorber plate so that the fluid can be heated while flowing through the flow passages, and one or more covers (glazings) that trap the incident solar radiation and thereby increase the efficiency of heat recovery by the solar panel.

Thus the field of this invention is in the category of flat plate solar collectors for heating fluids.

Description of Prior Art

Most flat plate solar panels developed in earlier years used a variety of metals for the flow passages, absorber and frame, and either glass or polymer for the cover(s). For example, Duffie and Beckman ("Solar Engineering of Thermal Processes," by John A. Duffie and William A. Beckman, Wiley Interscience Publication, John Wiley & Sons, New York 1980) describe typical flat plate collectors, and most use glass as cover(s) and copper, steel or aluminum for absorbers and tubing. U.S. Pat. No. 3,951,128 to Schoenfelder (1976) describes a flat plate-focal point collector that uses a reflector plate with mirror reflecting surface such as aluminum, steel or other suitable alloys, and dark painted conduits of copper. U.S. Pat. No. 4,011,856 to Gallager (1977) describes a flat plate collector that uses aluminum, base panel of Masonite, plywood or similar stiff, flat material and conduits of copper. More recently U.S. Pat. No. 5,974,611 to Bottum, Jr., et al (1998) describes a collector that uses copper tubes and plate with copper alloy fillets coupling tubes to plate.

While polymers have been used for many years for swimming pool heaters, such systems typically are for low temperature applications and most do not use a cover. In addition the polymers used in such applications are relatively low temperature materials that cannot withstand the temperatures required for heating of buildings and the heating of water for residential and industrial use. The solar panel assembly developed by Rhodes and Backlund (U.S. Pat. No. 4,205,662 dated Jun. 3, 1980 and assigned to Fafco, Inc) provides low temperature heating of water or other heat transfer fluids by use of various low-temperature polymers such as polyolefin, fiberglass reinforced polyester, polycarbonate, and acrylonitrile butadiene styrene (ABS). This panel provided for typical operating conditions for heating water up to 38 C (100 F) and for stagnation temperatures up to 93 C (200 F). Such panels have been used successfully for many years for swimming pool heaters. More recently (2009) Rhodes, et al (U.S. Pat. No. 8,161,963) developed a solar collector with an integrated storage tank that uses a thermosiphon effect to collect hot water within the storage tank. This panel uses thin film polyethylene sheets, acrylate, and polyvinyl chloride, all low temperature polymers. An integrated collector system using molded polymers is described in U.S. Pat. No. 6,814,070 (2004). This system combines heat collection and hot water storage in a single "passive" unit, and utilizes materials such as polycarbonate or acrylic, isocyanurate, cross-linked polyethylene (PEX), and aluminum.

U.S. Patent Publication No. 20130112190 describes a solar collector that utilizes polymer materials and consists of two manifolds plus a plurality of individual tubes for fluid flowing through the panel for collection of solar energy. Potential materials for the panel include high temperature nylon (HTN), chlorinated polyvinyl chloride (CPVC), polypropylene, polyethylene, polybutylene for the tubes, and polycarbonate, polyvinyl chloride (PVC), and polymethyl methacrylate (PMMA) for the cover, which is optionally also UV protected. The materials for the seals are rubber such as EPDM, VITON (etc), or a thermoplastic elastomer. The panel incorporates circular tubes with unique manifolds and sealing arrangements. The panel also includes optional compartments to enclose the individual tubes. The collector is designed so that one of the manifolds is rigidly fixed to the housing and the other manifold is flexibly fixed to the housing with flexible tubing in order to accommodate thermal expansion and contraction of the tubes. The tubes in the collector thermally expand lengthwise individually in and out of the enclosure past seals around the individual tubes. Such a design allows the use of either polymers or metals such as aluminum for the frame. The unit uses drainage holes to drain out of the enclosure any liquid or dirt that may have entered the enclosure.

U.S. Pat. No. 6,014,967 to Rekstad et al. (2000) describes an "Operating Method for Solar Collector Plant, and Control Unit for a Liquid Pump in a Solar Collector Plant." The solar panel for this system utilizes a number of channels for conducting heat transfer fluid that accommodate particles for capillary effect to lift the fluid to effectively sweep the sun-facing surface layer of the absorber. The absorber unit in the solar collector will have air in the absorber after prolonged standstill, and an objective of the operating method is to provide for efficient startup of the system after standstill while avoiding unstable flow. The invention also relates to a control unit for the pump providing liquid circulation in the solar collector. The control unit utilizes a microprocessor or other computer or logic-calculating circuit along with a solar radiation sensor adjacent to the absorber and a temperature sensor in the heat storage medium to control the pump operation. Thus the primary focus of the invention is to effectively manage the startup and shutdown of the pump for a solar collector that accumulates air in the flow passages during standstill.

SUMMARY OF THE INVENTION

Figure 2:
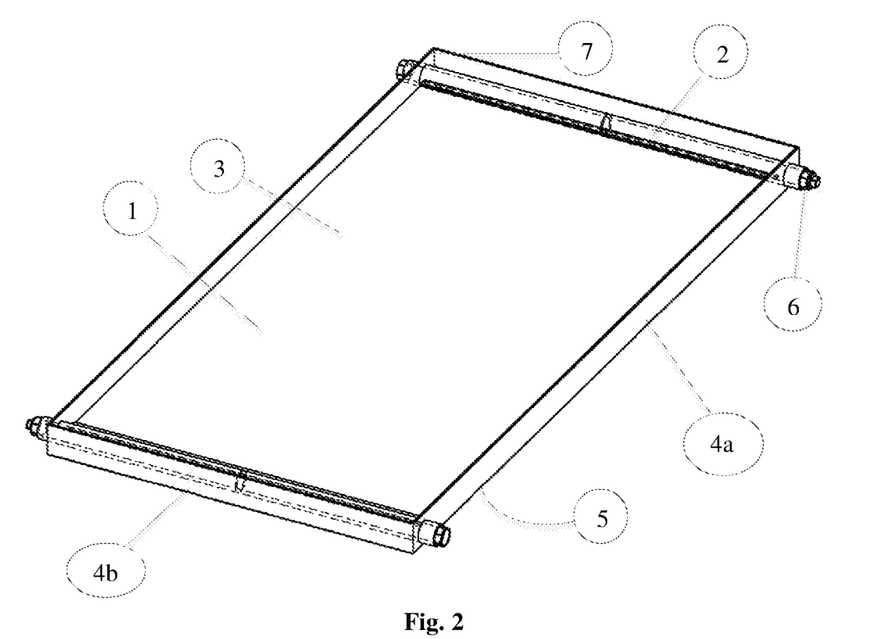
FIG. 2 provides a general layout of the assembled panel of this invention with significant components identified.
Figure 3:
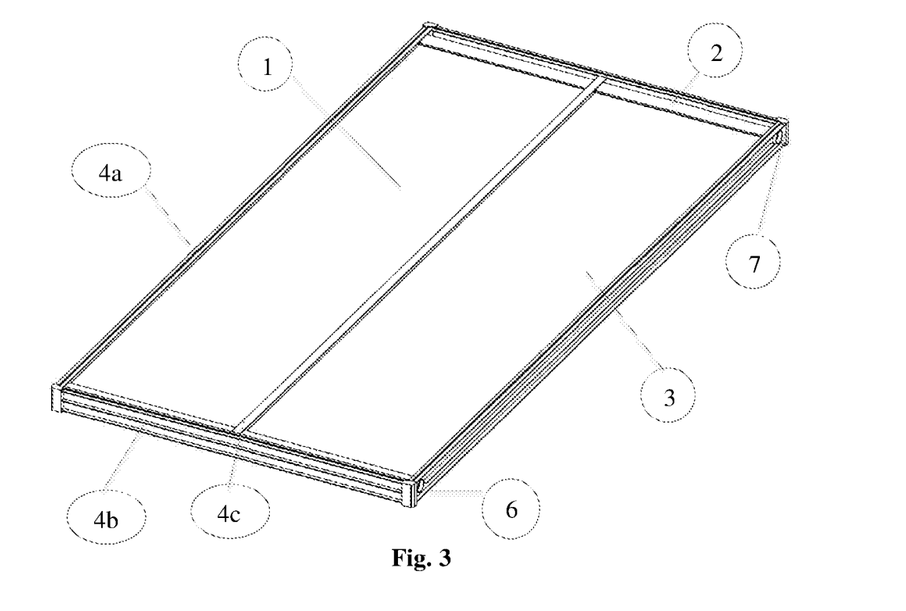
FIG. 3 shows an optional embodiment of the assembled panel that includes a middle I-beam; additional interior I-beams may be included as needed, depending on the overall size of the panel.

The invention is an ALL-POLYMER FLAT PLATE HEATING SOLAR PANEL WITH AN INTEGRATED CONTROLLER. A general layout of the panel is shown in FIG. 2. Another embodiment of the panel with a middle I-beam is shown in FIG. 3. Depending on the total width of the panel, additional interior I-beams may be added as needed in order to provide structural strength and stability of the panel.

Figure 4:
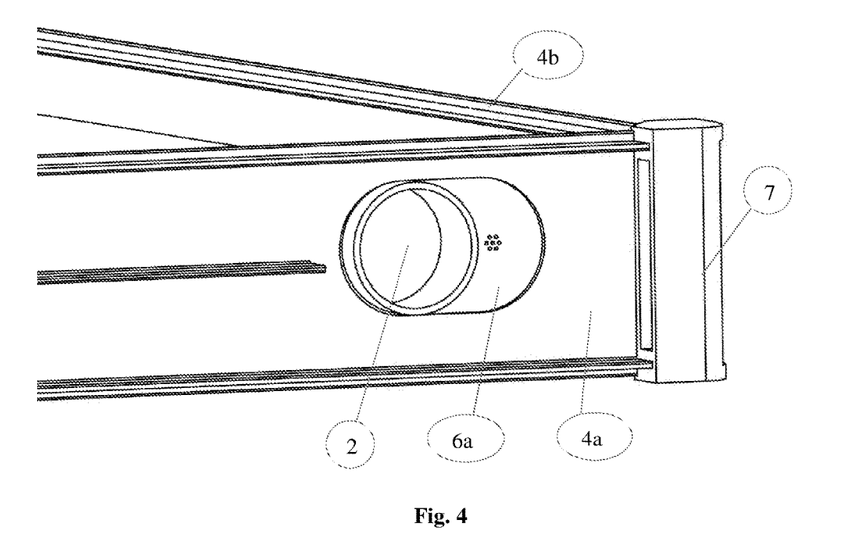
FIG. 4 shows the slot configuration in the panel frame to allow differential movement between the absorber and the frame. In the slot configuration, side I-beam (4a) has an extended slot cut to allow connector piece (6a) to slide along its length. The connector piece (6a) has an added flange to ensure the slot is always covered when differential movement is experienced.

Description of Panel: The panel is made of polymer materials with components that are fabricated by a molding process such as extrusion or injection molding. A major component of the panel is the absorber, which absorbs the incident solar radiation and which is connected to a manifold that provides for a heat transfer fluid to flow through parallel flow passages of the absorber to transfer heat from the incident solar radiation to water or other substance(s) to be heated. The panel has covers on the top and bottom, a frame for the structure and stability of the panel, and insulation between the absorber and back cover to reduce heat losses to the surroundings. The polymer materials are selected to meet major design objectives of durability, weatherability, high-temperature stability and low cost. Optional slots as shown in FIG. 4 are provided in the enclosure frame to allow relative motion between the header connectors and the frame in order to minimize thermal stresses when large temperature differences exist between the absorber/header and the frame. The slots in the enclosure frame also provide venting to relieve excessive internal pressures when high temperatures are reached. An integrated controller with wireless capability is installed to operate a pump to circulate a heat transfer fluid through the panel when heating capability exists and heat is needed to increase the temperature of the substance(s) to be heated by the panel.

Materials are a significant issue for any all-plastic solar panel. Materials for major components of this panel are as follows:
Absorber, manifold and connector pieces: high temperature nylon (HTN), polyphenylene (PPS), polyphenylsulfone (PPSU), polysulfone (PSU) or other polyphthalamide (PPA) or similar material.
Frame: any material listed above for the absorber, plus polyethylene terephthalate (PET) or similar material.
Top cover(s): polycarbonate (PC), acrylic or similar material with either external or internal protection from ultraviolet (UV) radiation.
Back cover: polycarbonate (PC), acrylic, acrylonitrile butadiene styrene (ABS) or similar material with either external or internal UV protection.
Insulation: polyisocyanurate foam, phenolic foam, or fiberglass or similar material.

Significant thermal stresses occur during large temperature changes in rigidly connected materials of a solar panel if the connecting materials have significantly different coefficients of linear thermal expansion (CLTE). Therefore the connecting absorber, manifold and connector pieces for this panel are made of the same material (although this is not essential as long as the CLTE values are similar for these pieces), and the frame, top cover(s), and back cover material have CLTE values that are approximately the same as that of the absorber, manifold and connector.

Significant thermal stresses also occur in locations where different components are rigidly connected together and significant temperature differences exist between the components. The major locations where such stresses occur for a flat plate solar collector are where the absorber/header joins the frame. The stresses are amplified if the absorber/headers are connected to the frame only at each end of the panel because major temperature differences between the frame and the absorber/header can cause differential thermal expansion of the absorber/headers and the frame. This problem is alleviated by either (1) using materials for the frame and the absorber/header that have coefficients of linear thermal expansion that accommodate the temperature differences, or (2) providing expansion joints or slots in the enclosure frame to allow relative motion between the header connectors and the frame, or both of these options. The solar panel described herein includes both of these options (1) and (2) to minimize thermal stresses. In addition the expansion joints in the side wall of the frame are designed to provide venting to relieve excessive internal pressures when the absorber is subject to high temperatures.

Another significant potential problem for polymer solar panels is the stagnation temperature of the absorber surface, that is, the temperature the absorber surface reaches when no fluid is flowing through the panel. For the base design of this invention, the stagnation temperature for the absorber surface can reach about 140-150 C, depending on the incident solar flux on the panel. Thus the polymer used for the absorber and adjacent components must remain stable for operation at this temperature. The materials specified above for the panel are stable up to 140-150 C, and remain stable for long-term operation up to this temperature. In addition, because of these potentially wide variations of temperature, slots are provided to allow relative movement between the header connector and the frame and to provide venting to prevent excessive internal pressure buildup and possible structural failure.

BRIEF DESCRIPTION OF THE DRAWINGS

FIG. 16 shows how the temperature sensor is mounted inside the manifold in order to have direct contact with the heat transfer fluid of the panel and thereby sense the temperature of that fluid.

DETAILED DESCRIPTION OF THE EXEMPLARY EMBODIMENTS

FIG. 1 illustrates an embodiment of a solar panel for heating fluids typical of previous disclosures. The solar panel features a glazing frame 4 supporting the solar panel. Transparent cover 1a allows solar radiation to pass through the cover. The transparent cover can be constructed of one or more layers 1a, 1b. The solar radiation is absorbed by the absorber 3a. The absorber plate heats a heat transfer fluid found within flow passages 3b. Heat transfer liquid is transferred from the flow passages to an outflow manifold (hidden by cover 1) and out the heat transfer fluid outflow passage 9b. The heat transfer liquid is subsequently circulated to an object or location to be heated and returned to the solar panel via return or inflow port 9a where the heat transfer fluid is distributed to flow passages 3b. The device is typically enclosed by an enclosure 7 and provides insulation 8 to insulate the absorber, manifold, and flow passages from the ground or ambient air.

FIG. 2 illustrates a preferred embodiment of a solar panel according to the present disclosure. FIG. 2 provides an all-plastic (or all-polymer) solar panel having one or more top covers 1 that allow for solar radiation to pass through the top cover. The top cover is supported by a frame that in the pictured embodiment has a series of I-beams 4a. 4b constructed to provide support to the top cover, manifold, absorber, back cover 5, and connector 3 for connecting the manifold to inflow and outflow tubes. The I-beams are held together by corner pieces 7. The solar panel provides for an all-polymer absorber 4 located beneath the top cover for absorbing solar radiation. The absorber provides for heat transfer from the solar radiation to a heat transfer fluid located within at least one passage. The heat transfer liquid is circulated through the solar panel by inflowing at an inflow manifold port, heated, and circulated out of the outflow manifold port provided for by at least one manifold 2, with preferably an outflow manifold and an inflow manifold. The manifold(s) are in a preferred embodiment connected to an outflow pipe or tubing by connectors 6. In a preferred embodiment of the invention each of these components is constructed from a polymer material that has been selected based on its heat expansion properties. These components are designed and selected with the heat expansion property determined by the expected temperature of the heat transfer fluid proximate to the component while the solar panel is in use. This protects the components by providing expansion properties that will prevent breakage by not over-expanding or bursting in the presence of the expected heat of the heat transfer fluid within the solar pane.

FIG. 4 provides for a top view of a top perspective view of an embodiment of the invention. FIG. 4 illustrates corner 7 connecting two I beams 4a, 4b of the invention. A manifold is provided for the inflow or outflow of a heat transfer fluid to an external pipe or tube connected via connector 6a.

Figure 5:
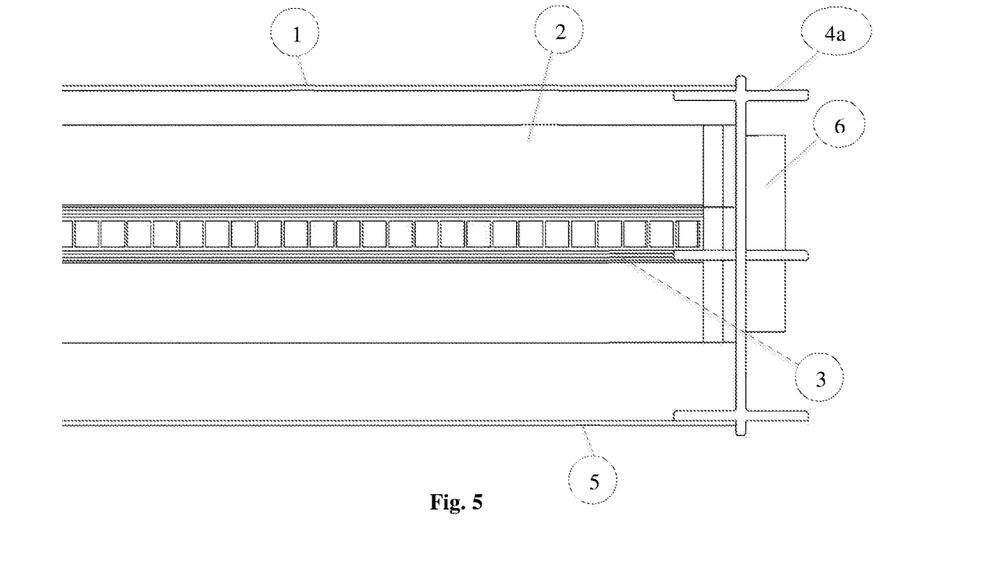
FIG. 5 is an end view cross-section of the panel showing the absorber, frame, connector and covers.

FIG. 5 provides a side view of the interior of an embodiment of the invention having an absorber 3 providing for passage of a heat transfer liquid. The heat transfer liquid enters via connector 6 and travels through manifold 2 where it is distributed to heat transfer passages of the absorber 3. The device is supported by side I-beam 4a which supports the top cover 1 as well as to the manifold and absorber components.

Figure 6:
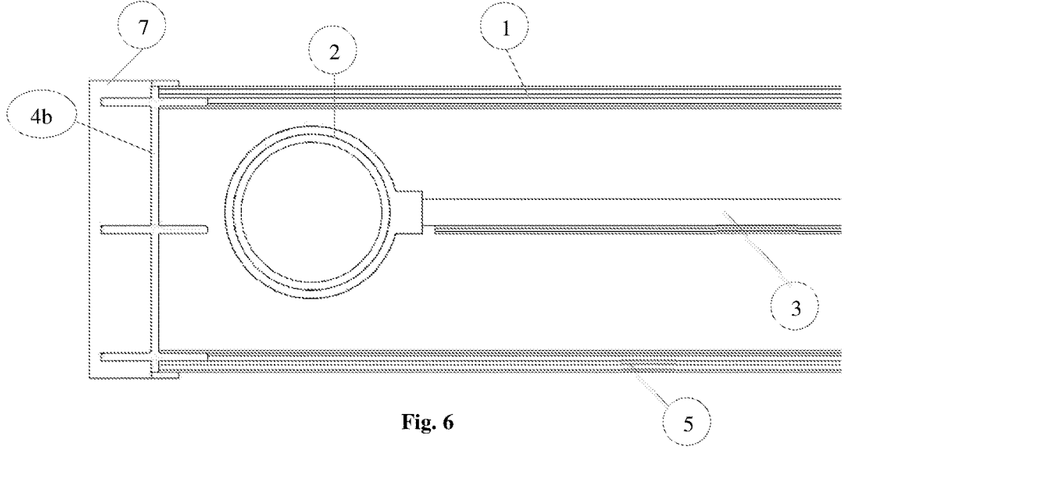
FIG. 6 is a side view cross-section showing the manifold and how it is connected to the absorber, the end piece I-beam, corner piece and covers.

FIG. 6 illustrates a side view of an embodiment of the invention in which the I beams and frame have been rendered transparent. The manifold (also called a header) receives heat transfer liquid from an external pipe or tube and transfers the heat transfer liquid to a passageway of the absorber 3.

Figure 7:
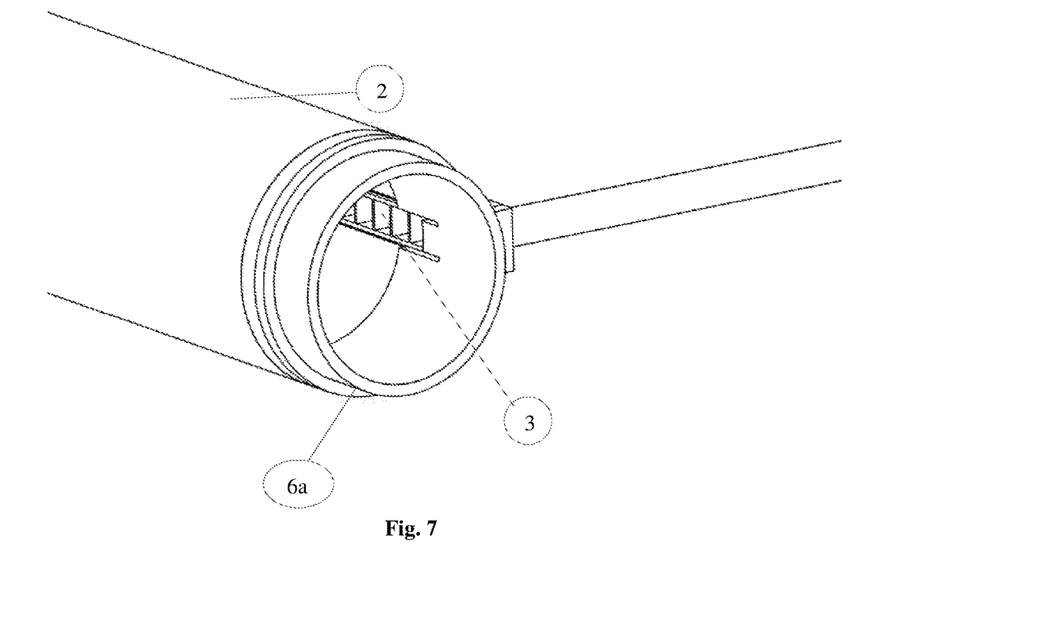
FIG. 7 is a perspective view of the connector and how it is connected to the absorber and manifold.

FIG. 7 illustrates an embodiment of a connection between the heat transfer passageways of the absorber 3 connecting to a manifold 2. The manifold 2 is connected to connector 6a that can be connected to an external pipe or tube for the outflow or inflow of a heat transfer liquid.

Figure 8:
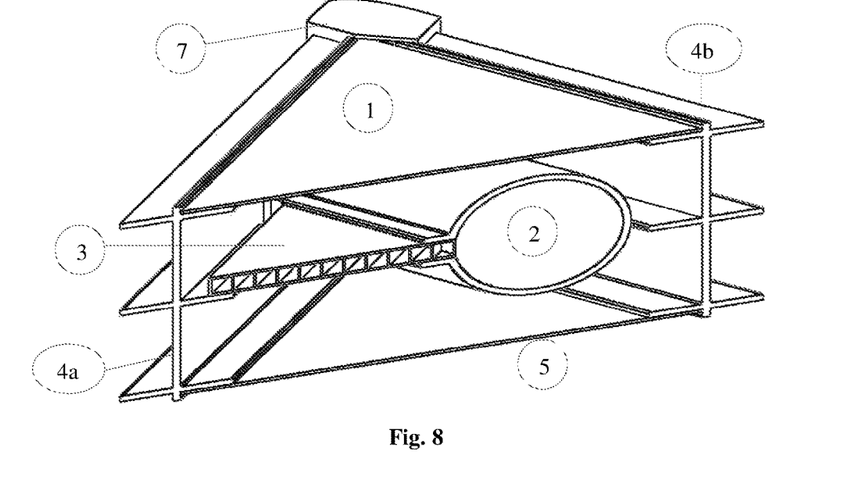
FIG. 8 is a perspective view of the corner of the panel showing how the absorber, manifold, I-beams, corner piece, and covers are connected.

FIG. 8 illustrates a cutout view of the interior of an embodiment of the invention showing the orientation of the transparent top cover 1, bottom cover 2, manifold 2, and absorber 3 supported by I beams 4a, 4b in connection with corner 4. The space between the manifold 2/absorber 3 and the bottom cover 5 can be filled with insulation material or an insulation board to prevent heat loss.

Figure 9:
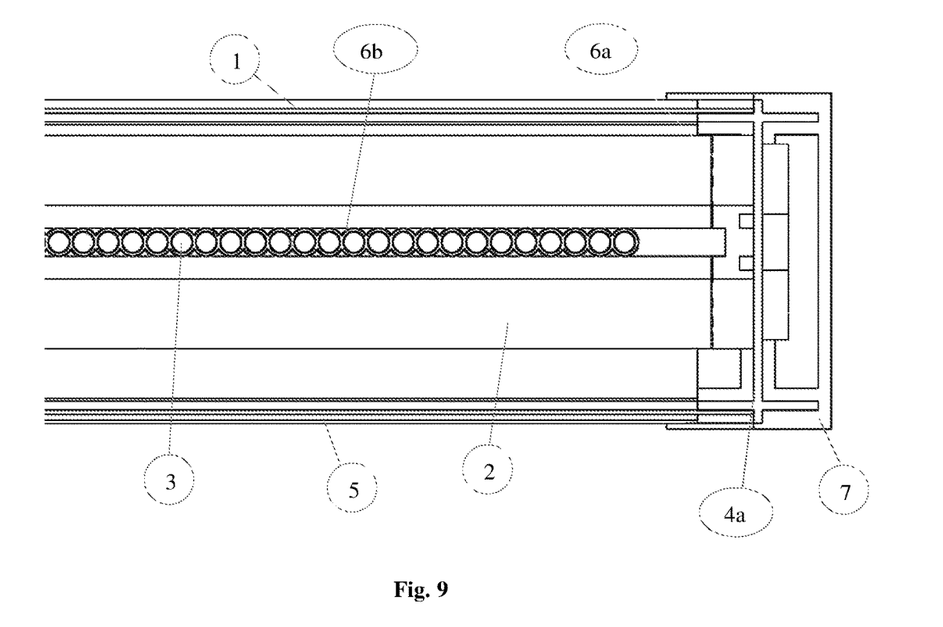
FIG. 9 is a second embodiment of the panel with round tube passages (instead of the rectangular tube passages as shown in FIG. 3) showing an end view cross-section of the panel showing the absorber, frame, connector and covers. Subconnector piece 6b is over-molded, welded, or glued between tubes and manifold.

FIG. 9 shows a further view of the passageways of the absorber 4 meeting the manifold 2. The internal components are supported by corner 7 in connection with I beam 4a. The connector comprises a sub connector for further connection capability with an external heat transfer fluid pipe or tube.

Figure 10:
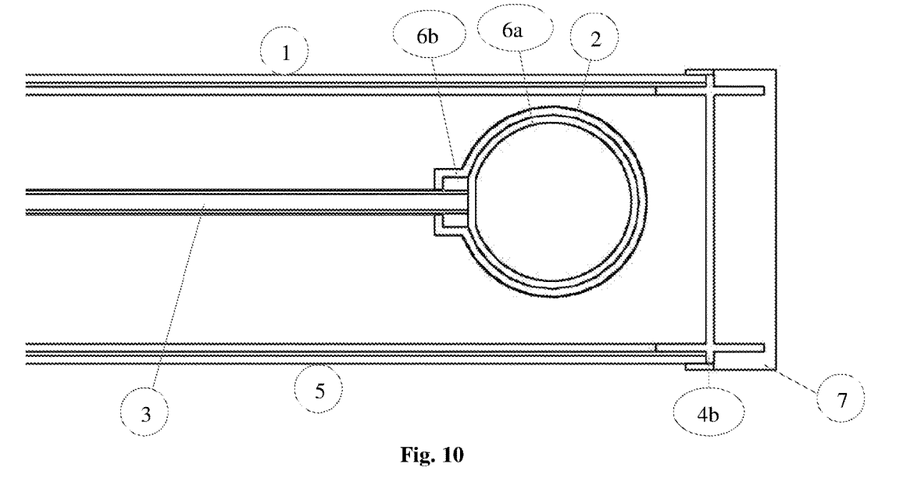
FIG. 10 is a second embodiment of the panel with round tube passages showing a side view cross-section of the manifold and how it is connected to the absorber, end piece I-beam, corner piece and covers.

FIG. 10 further illustrates a connector 6a and sub-connector 6b for facilitating the attachment of the absorber to the manifold and the manifold to an external fluid transfer tube or pipe. In a preferred embodiment each component is constructed from a polymer having heat expansion properties calculated to be adequate for expansion and contraction based on the temperature of a heat transfer fluid to be transported in the system.

Figure 11:
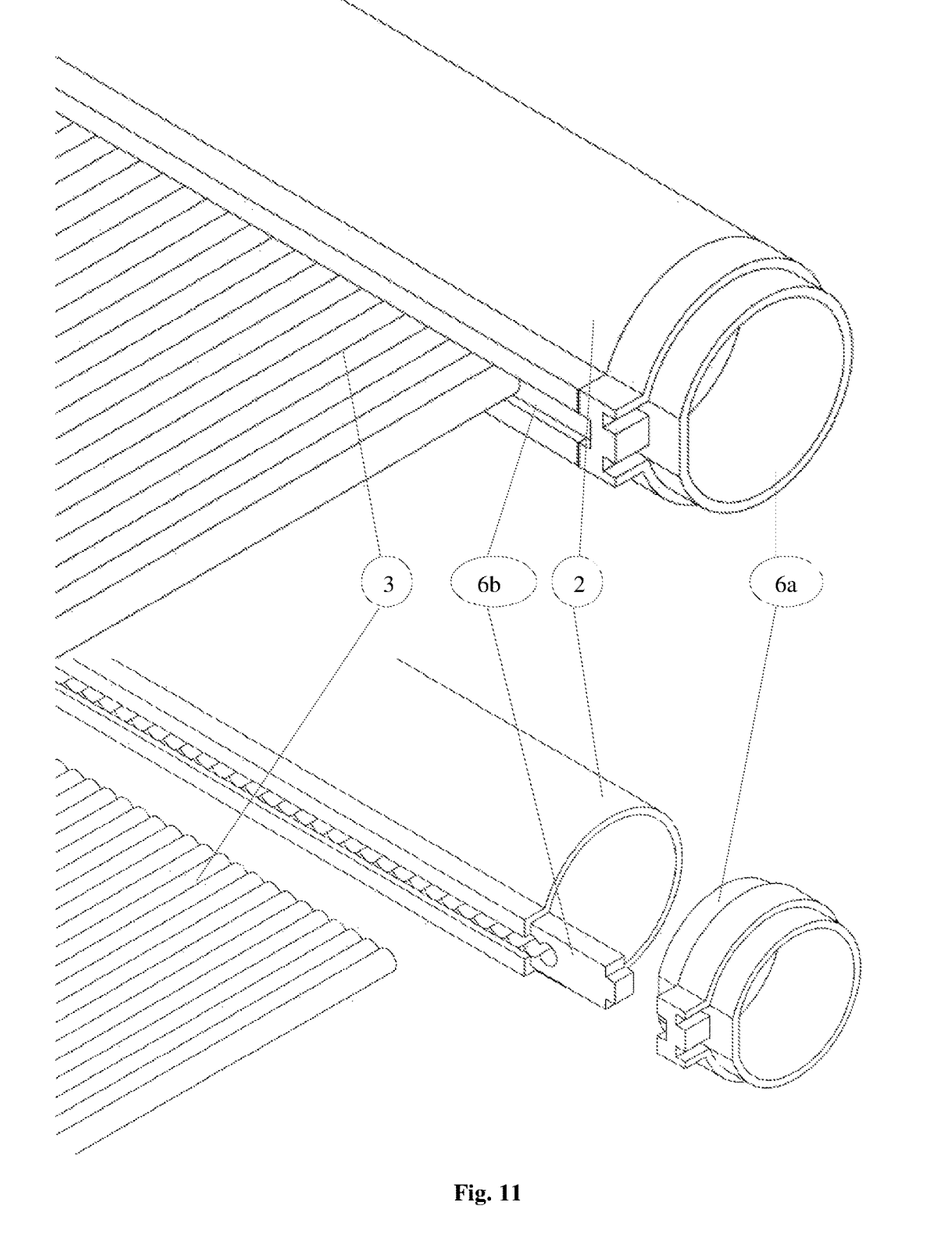
FIG. 11 is a second embodiment of the panel with round tube passages showing a perspective view of the connector and how it is connected to the absorber and manifold.
Figure 12:
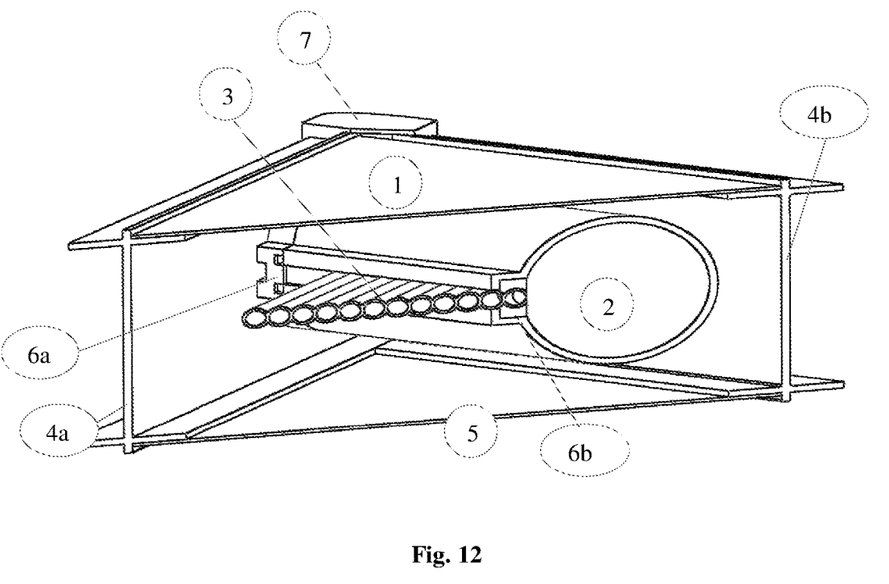
FIG. 12 is a second embodiment of the panel with round tube passages showing a perspective view of the corner of the panel showing how the absorber, manifold, I-beams, corner piece, and covers are connected.

FIG. 11 illustrates an embodiment of the connector mechanism of the invention for connecting a manifold to an external heat transfer fluid pipe or tubing. The connector 6a connects to sub connector 6b which is integrated into the connection between the absorber 3 and the manifold 2.

Figure 13:
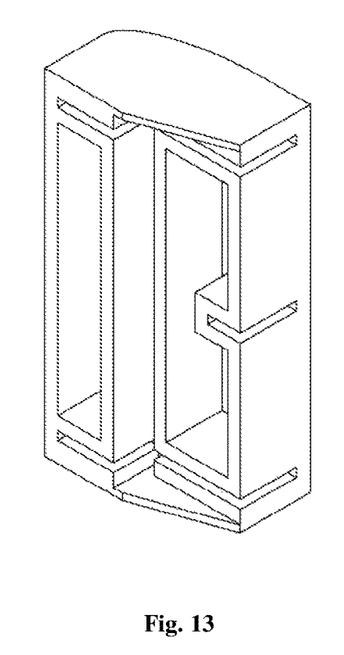
FIG. 13 shows the corner piece with slots for connecting to the I-beams of the frame.

FIG. 13 illustrates a view of the corner piece 7 for connection with the I beams found in embodiments of the invention. The corner piece provides slots into which the I beams are placed for providing support to the internal components of the solar panel as will as the top cover and bottom cover of the solar panel.

Figure 14:
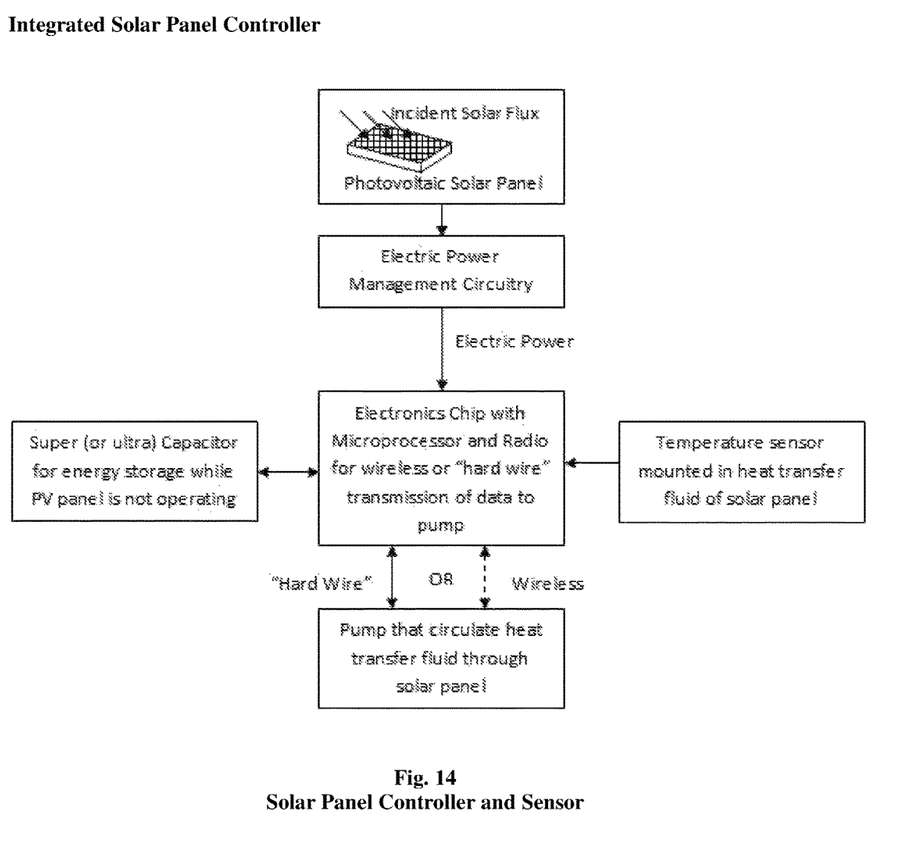
FIG. 14 is a schematic of the electronic circuitry and components of solar panel controller.

FIG. 14 illustrates a flow diagram of the operation of the solar panel. The photovoltaic solar panel provides electric power to an electronics chip or to a capacitor (preferably a super capacitor or ultra capacitor) which powers a pump to circulate heat transfer fluid through the solar panel or to an external object to be heated. The processor controls the pump in response to a temperature sensor located within the solar panel and can be programmed to circulate heat transfer liquid once the heat transfer liquid reaches a desired temperature.

Figure 15:
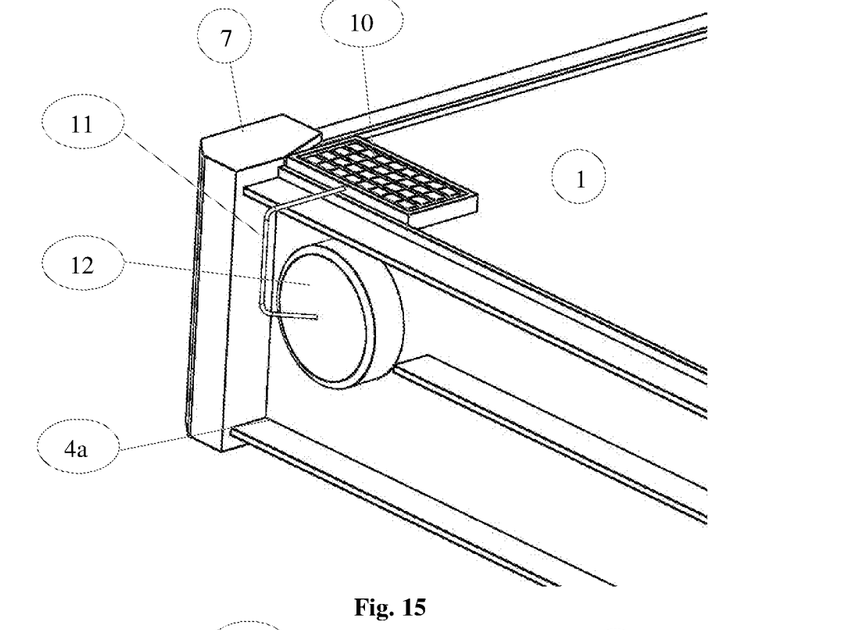
FIGS. 15 and 16 show perspective views of how the integrated solar panel controller is mounted on the solar collector.

FIG. 15 illustrates an external view of the arrangement of a photovoltaic solar panel 10 located on the top cover 1 of the solar panel. The photovoltaic solar panel is connected to a temperature sensor (see FIG. 16) and functions to control the operation of a pump or valve to allow outflow of the heat transfer liquid with the liquid reaches a desired temperature for heating of an object or space with the heat transfer fluid.

Figure 16:
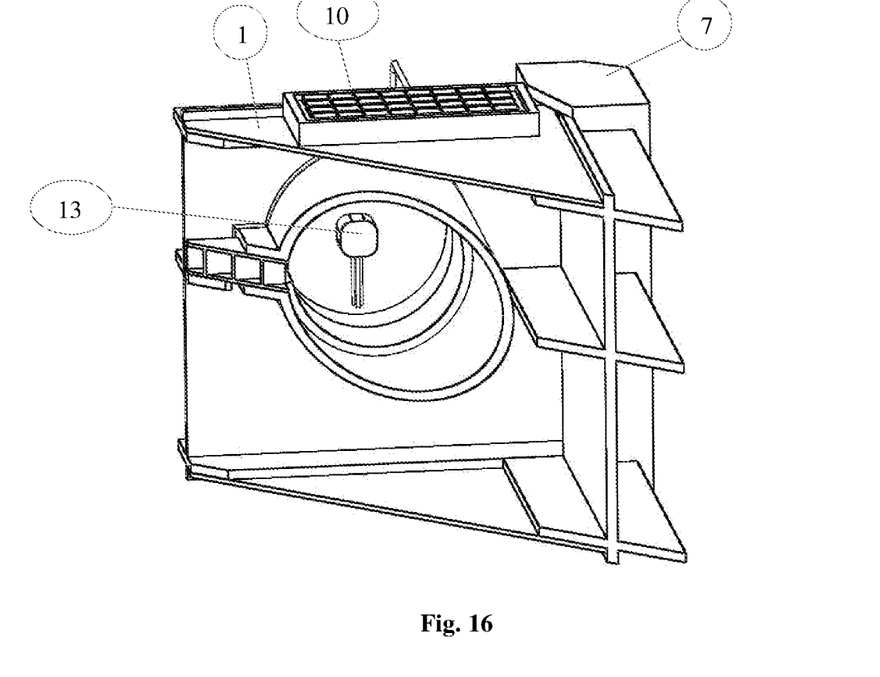

FIG. 16 illustrates an embodiment of the invention having a photovoltaic solar panel 10 and connected to a pump and/or solenoid for controlling a valve to open or close in accordance with if heat transfer flow is to occur. Temperature sensor 13 can be installed in an embodiment of the invention to open or close a valve or to engage or disengage a pump for controlling the flow a heat transfer fluid based on the temperature of the heat transfer fluid within, as pictured, the manifold. In a preferred embodiment the photovoltaic solar panel is located on the top cover 1 of the solar panel.

What is claimed is:

1. A flat plate solar collector comprising:
a flat plate polymer absorber having a surface, wherein said absorber is configured to absorb solar radiation incident to said absorber surface and to allow fluid flow through the absorber;
two polymer manifolds comprising at least one flow passage at each end of the absorber, wherein said polymer manifolds are connected to said polymer absorber such that said manifold flow passage is in contact with or proximate to said flat plate polymer absorber such that said polymer manifold and said flat plate polymer absorber are configured such that heat from said flat plate polymer absorber is transferred to said outlet manifold via a heat exchange fluid within said manifolds, wherein said manifolds at one end comprise an inflow port and said manifolds on other end comprises an outflow port, wherein said manifolds are connected to an outflow and an inflow for circulation of a heat transfer fluid into said manifolds via said inflow port through said manifold flow passage and out said manifold outflow port, wherein said flat plate polymer absorber and said polymer manifolds comprise polymer materials having equivalent thermal expansion characteristics, wherein said flat plate polymer absorber comprises a high temperature stable polymer stable at least to a temperature of 140 C; and
a pump, wherein said pump is configured to circulate fluid through said manifolds from said inflow port on one end to said outflow port of the second manifold at the other end.

2. The flat plate solar collector of claim 1, wherein said flat plate polymer absorber comprises at least one absorber passage having a length, wherein said manifold passage is perpendicular to said length of said absorber passage to facilitate heat transfer from said absorber passage to said manifold passage.

3. The flat plate solar collector of claim 2, wherein said absorber manifold passages are in a shape selected from a group of shape selected from the group consisting of circular shaped and rectangular with filleted corners.

4. The flat plate solar collector of claim 1, wherein said flat plate solar collector comprises a heat transfer fluid within said manifolds.

5. The flat plate solar collector of claim 4, wherein said heat transfer fluid comprises water.

6. The flat plate solar collector of claim 1, wherein said flat plate solar collector further comprises a photovoltaic solar panel element and an energy storage element configured for storing energy generated by said photovoltaic solar panel element, wherein said energy storage element is configured to supply energy to a controller for said pump.

7. The flat plate solar collector of claim 6, wherein said flat plate solar collector comprises a wireless controller configured for controlling the flow rate of said pump.

8. The flat plate solar collector of claim 7, wherein said flat plate solar collector comprises a temperature sensor positioned in said manifold.

9. The flat plate solar collector of claim 1, wherein said flat plate polymer absorber and said polymer manifolds comprise a polymer selected from at least one of high temperature stable nylon, polycarbonate, polysulfone, or similar material.

10. The flat plate solar collector of claim 1, wherein said flat plate solar collector comprises an enclosed structure comprising a top and a bottom and a frame supporting said top and said bottom, wherein said manifold and said flat plate polymer absorber are located within said enclosed structure and the top is a transparent polymer that allows the incident radiation to transmit through it to the flat plate polymer absorber and the bottom is an opaque polymer that insulates the interior of the panel from the surroundings.

11. The flat plate solar collector of claim 10, wherein said enclosed structure comprises a vent and an expansion slot in the side members of the frame to allow for linear expansion and contraction of the flat plate polymer absorber.

12. The flat plate solar collector of claim 10, wherein said flat plate solar collector comprises two or more transparent polymer top covers.

13. The flat plate solar collector of claim 10, wherein said flat plate solar collector comprises an insulation material.

14. The flat plate solar collector of claim 13, wherein said insulation material comprises a material selected from the group consisting of polyisocyanurate foam, phenolic foam, and fiberglass.

15. The flat plate solar collector of claim 1, wherein said manifold inflow port is in fluid engagement with an inflow pipe, wherein said manifold outflow port is in fluid engagement with an outflow pipe.

16. The flat plate solar collector of claim 15, wherein said flat plate solar collector comprise a first connector connecting said inflow pipe to said inflow port and a second connector connecting said outflow pipe to said outflow port, wherein said first connector and said second connector comprise a polymer selected from at least one of a high temperature stable nylon, polycarbonate, polysulfone, or similar material.

17. The method of claim 16, wherein said step of selecting at least one high temperature stable polymer molded component for construction of said flat plate solar panel comprises selecting a high temperature stable polymer based on the anticipated temperature exposure of a component in said layout of a flat plate solar panel and molding a component for said flat plate solar panel from said selected high temperature stable polymer.

18. The flat plate solar collector of claim 1 wherein the manifold passages are in a shape selected from the group consisting of circular shape, rectangular shape with filleted corners, and triangular with filleted corners.

19. A method of constructing a flat plate heating solar panel made of polymer materials, said method comprising the following steps:

the step of designing the layout of a flat plate solar panel comprising a plurality of components, wherein said components comprising a flat plate polymer absorber configured for absorbing the incident solar radiation, two manifolds comprising a heat transfer fluid located within said manifolds and at least one outflow port and at least one inflow port for fluid passage of said heat transfer fluid through said manifolds, wherein said manifolds are configured to collect heat generated in said flat plate polymer absorber by said incident solar radiation by use of a heat exchange liquid, and a pump configured for circulating a heat exchange liquid into said manifolds via said inflow port through said manifold and out said manifold outflow port;

the step of selecting at least one high temperature stable polymer molded component for construction of said flat plate solar panel based on the anticipated temperature maximum of said manifold and/or said absorber when utilized as a heating solar panel, wherein said high temperature stable polymer molded component comprises a high temperature stable polymer stable at least to a temperature of 140 C;

the step of assembling said flat plate heating solar panel.

20. The method of constructing a flat plate heating solar panel of claim 19, wherein said step of designing the layout of a flat plate solar panel further includes designing the layout of flat plate solar heating panel components further comprising a frame, a top cover, a back cover, connector elements connecting said inflow port of said manifold to an inflow pipe and said outflow port of said manifold to an outflow port, wherein said step comprises calculating the anticipated temperature of each component in said flat plate solar panel when used to collect solar radiation.

* * * * *